United States Patent
Lammens et al.

(10) Patent No.: US 8,593,709 B2
(45) Date of Patent: Nov. 26, 2013

(54) COLOR PROFILE SELECTION

(75) Inventors: Johan Lammens, Sant Cugat (ES);
Miguel Angel Lopez, Terrassa (ES);
Michel Georges Encrenaz, Rubi (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 298 days.

(21) Appl. No.: 12/841,575

(22) Filed: Jul. 22, 2010

(65) Prior Publication Data
US 2012/0019881 A1 Jan. 26, 2012

(51) Int. Cl.
*H04N 1/46* (2006.01)
*H04N 1/405* (2006.01)
*G06F 15/00* (2006.01)
*G06K 15/00* (2006.01)
*G01J 1/10* (2006.01)
*G01D 18/00* (2006.01)
*B41J 29/393* (2006.01)
*B41J 5/30* (2006.01)
*G01N 21/86* (2006.01)

(52) U.S. Cl.
USPC .......... 358/530; 358/1.9; 358/1.12; 358/3.06; 356/243.5; 702/85; 347/19; 400/62; 250/559.07

(58) Field of Classification Search
USPC .......... 358/530, 1.9, 1.12, 3.06; 356/243.5; 702/85; 347/19; 400/62; 250/559.07
See application file for complete search history.

(56) References Cited

U.S. PATENT DOCUMENTS

| | | | |
|---|---|---|---|
| 6,291,829 B1 * | 9/2001 | Allen et al. | 250/559.07 |
| 6,459,825 B1 | 10/2002 | Lippincott | |
| 6,654,143 B1 * | 11/2003 | Dalal et al. | 358/1.9 |
| 6,750,442 B2 | 6/2004 | Bala et al. | |
| 7,301,659 B2 | 11/2007 | Timperman et al. | |
| 2004/0012817 A1 * | 1/2004 | Brewington et al. | 358/3.06 |
| 2005/0031392 A1 * | 2/2005 | Yamamoto et al. | 400/62 |
| 2005/0152597 A1 * | 7/2005 | Spaulding et al. | 382/162 |
| 2007/0291289 A1 | 12/2007 | Kuo et al. | |
| 2008/0204829 A1 * | 8/2008 | Harrington | 358/504 |
| 2009/0027701 A1 | 1/2009 | Alimpich et al. | |
| 2009/0190126 A1 * | 7/2009 | Martinez | 356/243.5 |

FOREIGN PATENT DOCUMENTS

GB    2 407 932    5/2005

* cited by examiner

*Primary Examiner* — Marivelisse Santiago Cordero
*Assistant Examiner* — Temitayo Folayan (57) ABSTRACT

Scanner, method or computer program product, arranged to sense media color information, store predetermined color values of preselected non-printed media and storing corresponding color profiles adapted for the respective preselected media, and process sensed color values, compare a sensed color value with the predetermined color values, and select one of said color profiles based on the comparison.

13 Claims, 9 Drawing Sheets

| Color Differences among white points | Matte paper | Recycled | Photo | Tracing |
|---|---|---|---|---|
| Matte paper | 0 | 7.4 | 4.3 | 17.3 |
| Recycled | 7.4 | 0 | 5.9 | 13.3 |
| Photo | 4.3 | 5.9 | 0 | 18.4 |
| Tracing | 17.3 | 13.3 | 18.4 | 0 |

Fig. 3

| Media type (ICC profile) | L* | a* | b* | X | Y | Z |
|---|---|---|---|---|---|---|
| Matte inkjet | 92.36 | 1.32 | -7.74 | 79.23 | 81.51 | 75.91 |
| Recycled | 89.38 | 0.23 | -1.05 | 72.36 | 74.97 | 62.89 |
| Photo (AgX&glossy) | 94.4 | 0.15 | -4.14 | 83.16 | 86.2 | 75.81 |
| Tracing | 76.14 | 0.38 | -1.78 | 48.45 | 50.12 | 42.73 |

| media type (sample) | dRGB | | | dE76 color differences with respect to the profiles white point | | | |
| --- | --- | --- | --- | --- | --- | --- | --- |
| | device R | device G | device B | matte paper | Recycled | Photo | Tracing |
| white paper (coated) | 234 | 233 | 235 | 1.1 | 5.8 | 3.3 | 17.7 |
| Recycled | 221 | 219 | 215 | 2.9 | 1.5 | 2.0 | 13.9 |
| Photo (glossy) | 236 | 238 | 240 | 5.1 | 7.1 | 1.5 | 19.3 |
| Tracing | 200 | 198 | 195 | 4.7 | 4.2 | 7.0 | 1.5 |

Fig. 9

| Sample name | Media type | Optimum profile should be | Automatic selection could be completed? | If automatic selection was done, was the optimum profile chosen automatically? | If automatic selection failed, was the default profile the optimum? |
|---|---|---|---|---|---|
| It8-hwcoated-dye | Coated paper | Matte | Yes | Yes | - |
| It8-hwcoated-pigment | Coated paper | Matte | Yes | Yes | - |
| It8-laser-plain | plain | Matte | Yes | Yes | - |
| It8-plain-dye | plain | Matte | Yes | Yes | - |
| It8-Recycled-pigment | Recycled | Recycled | Yes | Yes | - |
| It8-Recycled-dyet | Recycled | Recycled | Yes | Yes | - |
| It8-AgX | Glossy | Photo | No | - | No |
| It8-pidpg-pigment | Glossy | Photo | Yes | Yes | - |
| It8-uhg-dye | Glossy | Photo | Yes | Yes | - |
| It8-Tracing-dye | Tracing | Tracing | Yes | Yes | - |
| It8-vellum-dye | Vellum | Tracing | Yes | No | - |
| It8-Translucent-dye | Translucent Bond | Tracing | Yes | No | - |
| Iqat-hwcoated-sample | Coated paper | Matte | Yes | Yes | - |
| Kids-poster-offset | Offset matte paper | Matte | No | - | Yes |
| Offset-sample01 | Offset matte paper | Matte | Yes | Yes | - |
| Offset-sample02 | Offset matte paper | Matte | Yes | Yes | - |
| Offset-sample03 | Offset matte paper | Matte | Yes | Yes | - |
| Offset-sample04 | Offset matte paper | Matte | Yes | Yes | - |
| Venice-picture01 | Glossy | Photo | Yes | No | - |
| Venice-picture02 | Glossy | Photo | Yes | Yes | - |
| Venice-picture03 | Glossy | Photo | Yes | Yes | - |
| Plain render | Plain | Matte | Yes | Yes | - |
| Dogs-picture | Glossy | Photo | No | - | No |

TOTAL: 23 samples.  Optimum automatic selection: 17 samples.
Non-optimum automatic selection: 3 samples.  Default profile was optimum selection: 1 sample.

Fig. 10

COLOR PROFILE SELECTION

BACKGROUND OF THE INVENTION

Scanners are used to obtain a copy of an original image. The digital image file can be stored, processed and/or printed. To obtain an accurate copy of the original, scanners need to be able to scan so that the colors of the scanned file should be close or identical to the original.

A known type of scanner is a CIS (Contact Image Sensor) scanner, wherein the image sensor scans the original at a close distance from the original to obtain an accurate image. CIS scanners are usually provided with a linear array of red, green and blue LEDs (Light Emitting Diodes) for shining light onto the original and an image sensor for recording the image, as reflected by the original.

Particular scanners use a CCD (Charged Couple Device) or CMOS (Complementary Metal Oxide Semiconductor) type image sensor. These sensor types are sometimes used in older and/or more expensive scanners. CCD and CMOS type scanners are known to obtain higher color accuracy and/or a higher resolution than CIS scanners. However, these types of scanners are expensive and space inefficient as compared to the CIS type scanners.

At the end of the manufacturing stage, and during the lifetime of the scanner, color charts can be used to calibrate the scanner. By regularly calibrating the scanner, a high color accuracy of the scanner may be maintained or obtained. To enhance color accuracy, scanners and scanner software oftentimes allow for pre-selection of the type of original image, such as photo or text. Also, color tuning may be applied after scanning to improve the color accuracy of the obtained image file.

BRIEF DESCRIPTION OF THE DRAWINGS

For the purpose of illustration, certain embodiments of the present invention will now be described with reference to the accompanying diagrammatic drawings, in which.

DETAILED DESCRIPTION

In the following detailed description, reference is made to the accompanying drawings. The embodiments in the description and drawings should be considered illustrative and are not to be considered as limiting to the specific embodiment of element described. Multiple embodiments may be derived from the following description and/or drawings through modification, combination or variation of certain elements. Furthermore, it may be understood that also embodiments or elements that are not literally disclosed may be derived from the description and drawings by a person skilled in the art.

Figure 1:
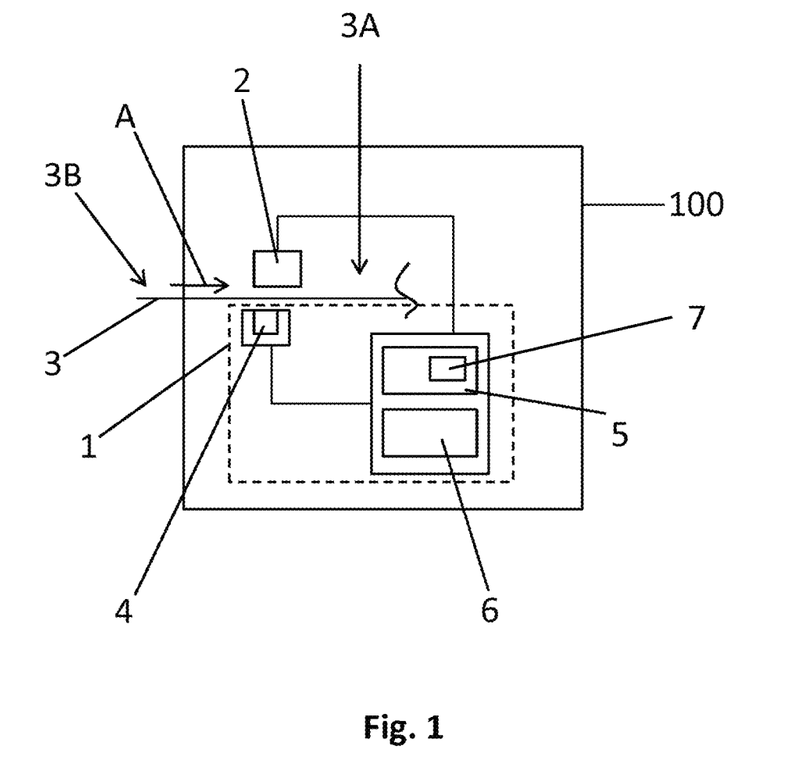
FIG. 1 shows a diagram of an embodiment of a scanner within a printer.

FIG. 1 shows a scanner 1. The scanner 1 may comprise a large format scanner. The scanner 1 may be provided within, integrated with, or connected to, a printer 100. The printer 100 may comprise a large format printer. Here, large format may be understood as being arranged to process media of at least approximately 0.5, at least approximately 0.8, or at least approximately 1.2 meters wide.

The printer 100 may comprise a print head 2. The print head 2 may be arranged to print onto a print medium, while the print medium is advanced along a media advance path, through the printer 1, in a media advance direction A. The print media may include paper, transparent media, plastics, polyurethane, polyvinyl, etc. The print media may be suitable for large format printing. The print head 2 may comprise a scanning print head 2. In other embodiments, the print head 2 may comprise a page wide array. The printer 100 may comprise an inkjet printer.

In this embodiment, the printer 100 may be used to scan a medium 3 containing an original image, for obtaining a digital copy of the original image. A print medium may then be placed in the printer 100 so that the obtained image can be printed onto the print medium. In an embodiment, the printer 100 and scanner 1 are arranged to obtain large format digital and/or printed copies of original images.

The scanner 1 may be arranged to scan a medium 3 containing an original image. In an embodiment, a media advance drive is provided that is arranged to move the medium 3 along the scanner 1, and/or the print head 2. In use, first a leading part 3A of the medium 3 may be scanned and thereafter a trailing part 3B, as determined by the media advance direction A. The scanner 1 may be arranged to scan an image of the medium 3 from a close distance, for example from approximately 0.1 to approximately 10 millimeters. The scanner 1 may comprise an optical sensor 4 for recording the image, as reflected by the original image. The optical sensor 4 may be embedded in the printer 100 arranged along the media advance path. The sensor 4 may comprise a CIS (Contact Image Sensor) type scanner. The optical sensor 4 may comprise a linear array of RGB (red, green and blue) LEDs (Light Emitting Diodes) for shining light onto the original image, for reflection by the original image. The optical sensor 4 may comprise an array of photodiodes.

In an embodiment of this disclosure, the scanner 1 is arranged to automatically select a color profile. The color profile may refer to an ICC color profile, for example for mapping a device dependent color profile to a device independent color profile and/or vice versa. In a further embodiment, the scanner 1 is arranged to automatically select a scanner color profile.

The optical sensor 4 may be arranged to sense media color information. This information may be compared to predetermined color values pertaining to predetermined media types, for example the white points of glossy paper, matte paper and/or other types of media. The scanner 1 may comprise a storage device 5 and a processor 6. The printer 100 may comprise a storage device 5 and processor 6. The printer 100 and scanner 1 may use the same or a different storage device 5 and processor 6. The processor 6 may be configured to process the color values of the medium 3, as sensed by the optical sensor 4, for example an RGB value of a paper's white point. The processor 6 may be configured to compare the sensed color value with a predetermined color value, corresponding to a particular type of media 3, for example an input media's white point with a pre-calculated white point value of a pre-selected medium.

The processor 6 may be configured to map a sensed device dependent color value, such as RGB, to a device independent color value, such as CIELab or CIEXYZ. In this description, a sensed color value may refer to either the device dependent or the device independent color value that corresponds with the sensed signal. This device independent color value may refer to a color value that is first sensed as a device dependent color value, e.g. in RGB, and thereafter mapped to a device independent color value, such as CIEXYZ or CIELab.

The storage device 5 may comprise any type of non-volatile memory. The storage device 5 may store predetermined color values and predetermined color profiles of preselected media types. For example, the storage device 5 may store predetermined white point values and predetermined color profiles, for example of glossy, matte or photo paper.

The predetermined color values may comprise a white point value of a pre-calculated color profile of a preselected medium. In this description, a "white point" may be defined as a color profile's whitest point, i.e. the color of the color space that is closest to white, although a non-printed region's of a corresponding medium does not need to be white. The color profile's white point may be approximately coincident with the unprinted medium's color. For example, a non-printed region of the medium 3 may be transparent, textured, grey, brown, green, or have any other color.

The processor 6 may be configured to compare the sensed color value with the predetermined color values stored in the storage device 6. Based on this comparison, the processor 6 may select a color profile. The algorithm and/or instructions for executing that comparison may be described in a computer program product 7. The computer program product 7 may be stored in the storage device 5, and/or may for example at least partly be stored on a network.

Figure 2:
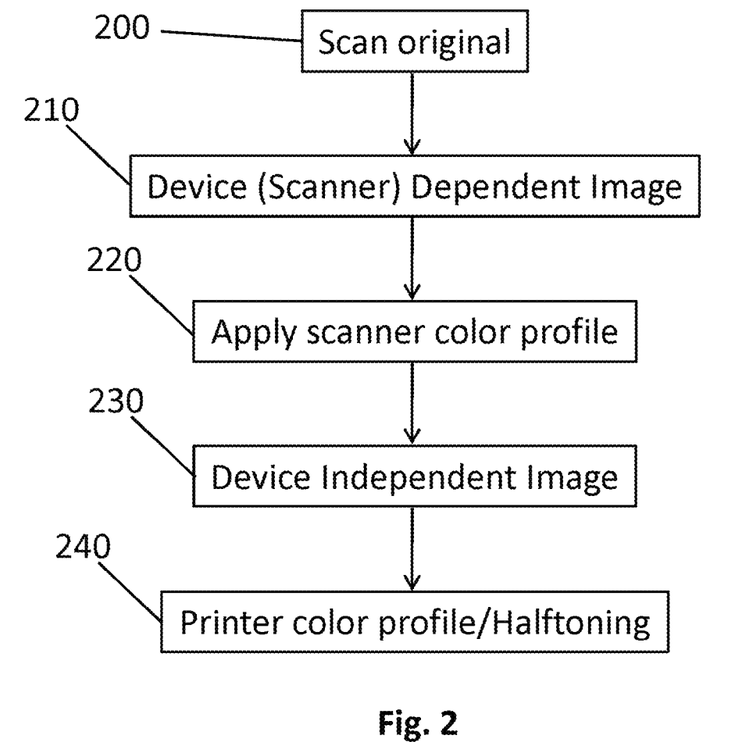
FIG. 2 shows a flow chart of an embodiment of a scan and print pipeline.

The color profile selection may be better understood with reference to FIG. 2, showing a diagrammatical embodiment of a scan and print pipeline flow chart. Selecting a correct color profile that closely matches the medium 3 to be scanned may result in better color matching of the original and the printed image.

A medium 3 containing an original image may be moved with respect to the scanner 1, for scanning the original image (step 200). A device dependent image of the original image may be obtained (step 210). For example, the device dependent image may comprise a digital RGB image, the color values of which may be dependent of the type of scanner 1. Thereafter, by applying a scanner color profile (step 220) the device dependent image may be converted into a device independent image, for example expressed in CIELab or CIEXYZ color coordinates (step 230), using color mapping. The scanner color profile may be an ICC color profile. The colors of the obtained device independent image may depend on the used scanner color profile. The device independent image may be converted into printer dependent ink drops or color layers, for example by applying a printer dependent ICC color profile and halftoning (step 240). Indirectly, the colors of the obtained printed image may strongly depend on the used scanner color profile. Consequently, the accuracy of the colors of the copied image with respect to the original image may depend on the scanner color profile.

In this disclosure, the scanner 1 may automatically select a scanner color profile based on a non-printed media region of a medium 3. By sensing the color information of the non-printed region 8, the type of media 3 can be estimated, and a matching scanner color profile can be selected, as will be further elaborated in this disclosure. In this description, a non-printed region 8 may be defined as a region or sample of the media that does not ink or toner or other colored substance for imprinting an image.

Figure 3:
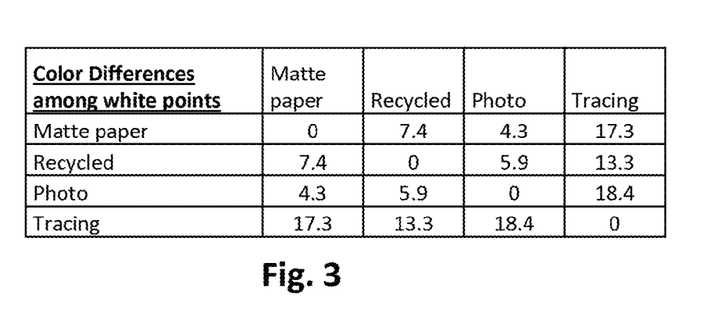
FIG. 3 shows a table plotting the color differences between the white points of the different media samples, expressed according to the dE76 standard.

FIG. 3 shows the differences between the predetermined color values of the white points of predetermined media types in dE76 (Delta-E 1976). It shows that the differences between the white points are large enough to be detectable by scanners, for example by photodiode type scanners such as CIS type scanners, which are relatively cost efficient.

In some conventional systems, selection of a scanner color profile is done manually. For example, a user must indicate whether an original image contains photo or text so that a corresponding ICC color profile is applied. In other conventional systems, more expensive optical sensors are applied, such as CMOS or CCD, in order to achieve a better color accuracy. In a test (not shown) scanners equipped with an automatic scanner color profile selection based on a non-printed medium region 8, as discussed in this disclosure, showed more accurate color results than the far more expensive CMOS and CCD type scanners.

Figure 4:
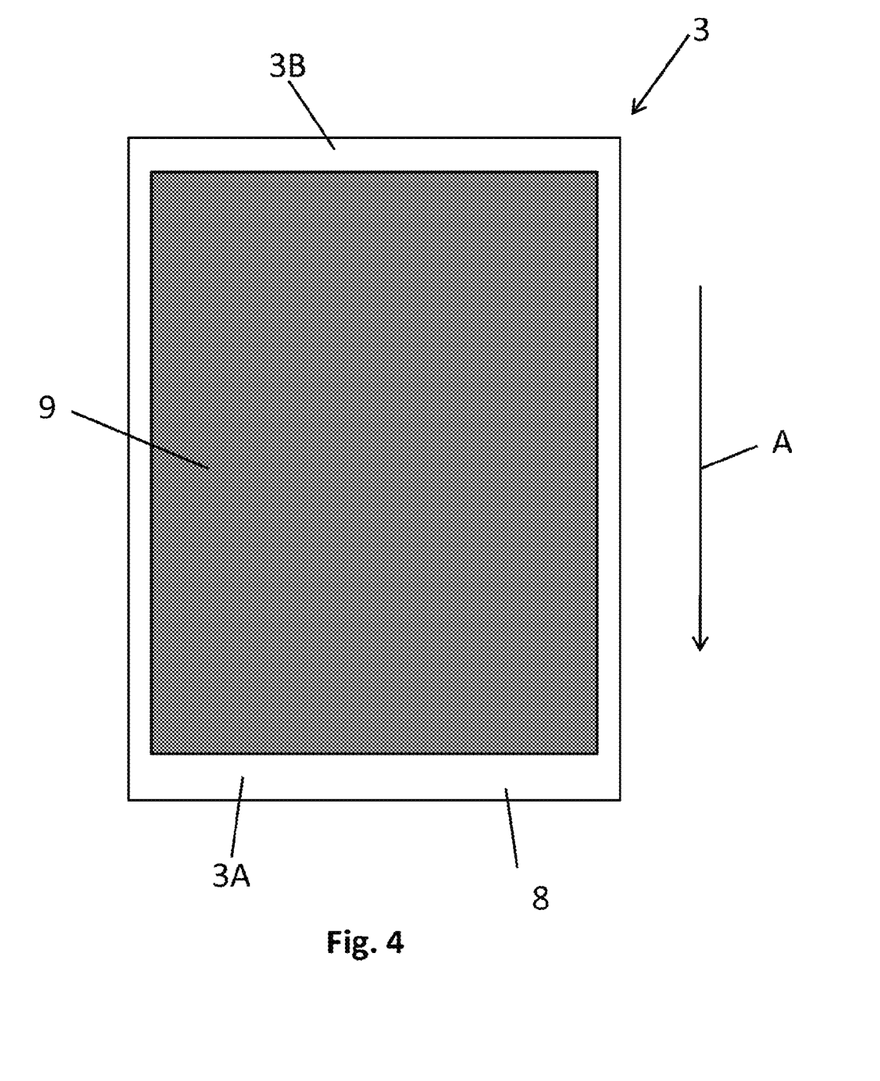
FIG. 4 shows an embodiment of a medium containing an original image.

FIG. 4 shows a sample of a medium 3 containing an original image 9, and a non-printed region 8. The media advance direction A and a leading 3A and trailing part 3B are also shown.

Figure 5:
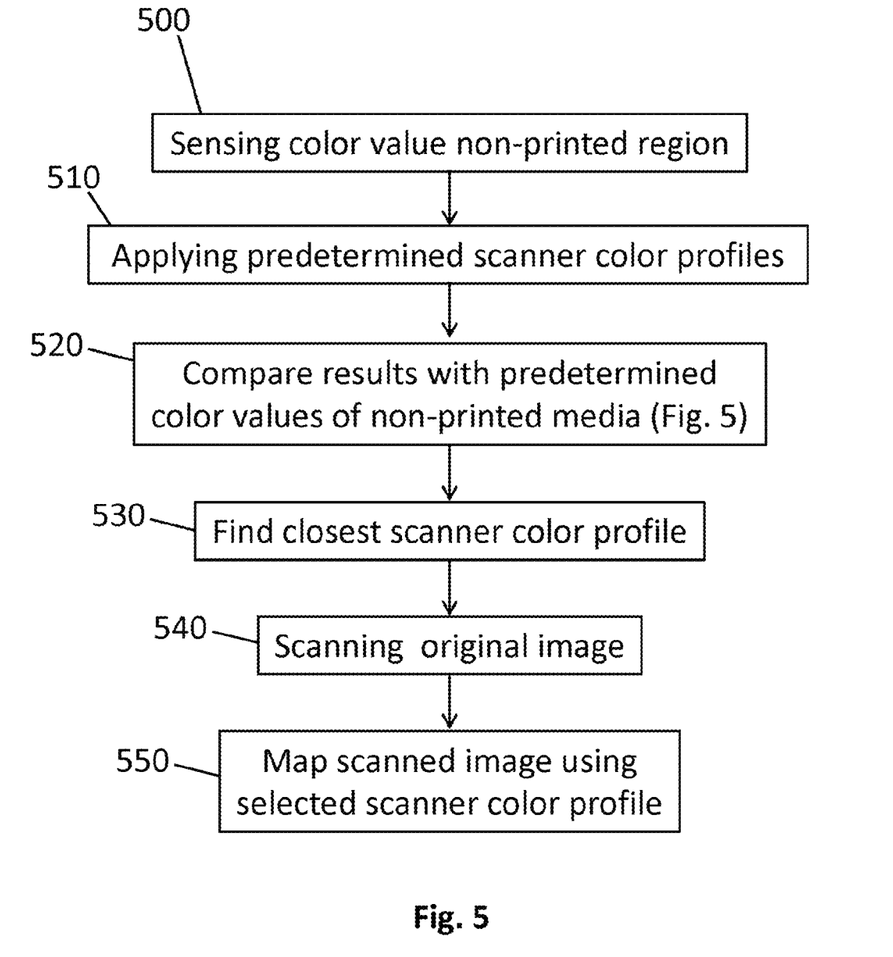
FIG. 5 shows an embodiment of a method of automatically selecting a color profile for specific media.

FIG. 5 shows a flow chart of a method of selecting a scanner color profile according to an embodiment of this disclosure. A sample of a non-printed region 8 of the medium 3 containing an original image 9 may be scanned. The color value of this non-printed region 8 may be sensed (step 500). This may result in a device dependent digital image file, for example expressed in RGB. In an embodiment, this may be achieved by calculating an average color value of a small region of pixels with maximum RGB values within or near a scanned first row or area, for example in or near a leading part 3A, of the medium 3 containing the original image.

In one embodiment, the non-printed region 8 may be derived from a scan of the whole medium 3, or a scan of a part of the medium 3 that contains the original image. The processor 6 may be configured to analyze the input image and derive the non-printed region thereof. An algorithm may be applied to retrieve non-printed region 8.

In an embodiment, the device dependent color values are converted into device independent color values, such as for example CIEXYZ or CIELab by applying predetermined scanner color profiles (step 510). The number of predetermined scanner color profiles may be the same as the numbers of preselected media types. Each predetermined scanner color profile may correspond to a predetermined media type. Each single sensed device dependent color value may be mapped for each scanner color profile, which may result in different device independent color values for each single sensed device dependent color value.

Figure 6:
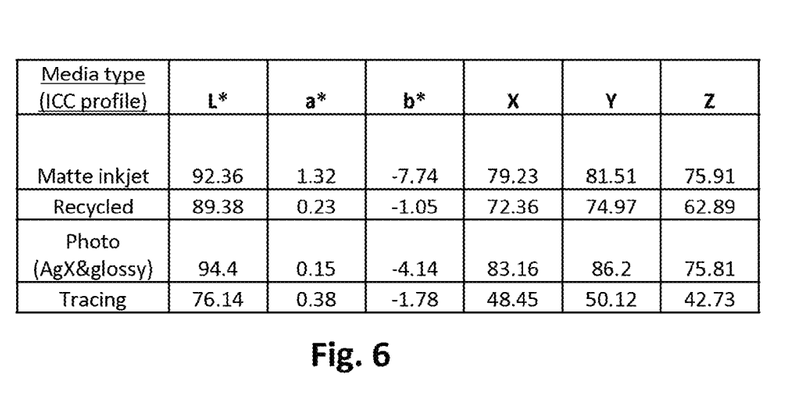
FIG. 6 shows a table plotting device independent color values of the white points pertaining to the color profiles of different media samples.

The predetermined color values of preselected non-printed media samples may be stored in the storage device 5. As an example, FIG. 6 shows the average white point color values of four predetermined color profile corresponding to preselected media types. In the example, the media samples are "Matte", "Recycled", "Photo" and "Tracing". In the example, the predetermined color values are expressed as CIELab and CIEXYZ values.

Continuing with FIG. 5, the sensed color values obtained in step 510 may be compared with the predetermined color values (step 520), for example white point values such as indicated in FIG. 6. The predetermined color value that is closest to the sensed (and mapped) color value, for a corresponding scanner color profile, may then be determined. For example, the difference between the mapped sensed color value coordinates and the predetermined color value coordinates may be calculated for each scanner color profile. The scanner color profile that corresponds to the smallest difference may be selected (step 530) as the closest available profile.

The original image 9 may be scanned (step 540). The original image may be mapped (step 550), for example from the scanner dependent RGB coordinates to device independent values, using the closest available scanner color profile selected in step 530. Thereafter, the mapped original image may be stored in the storage device 5.

Figure 7:
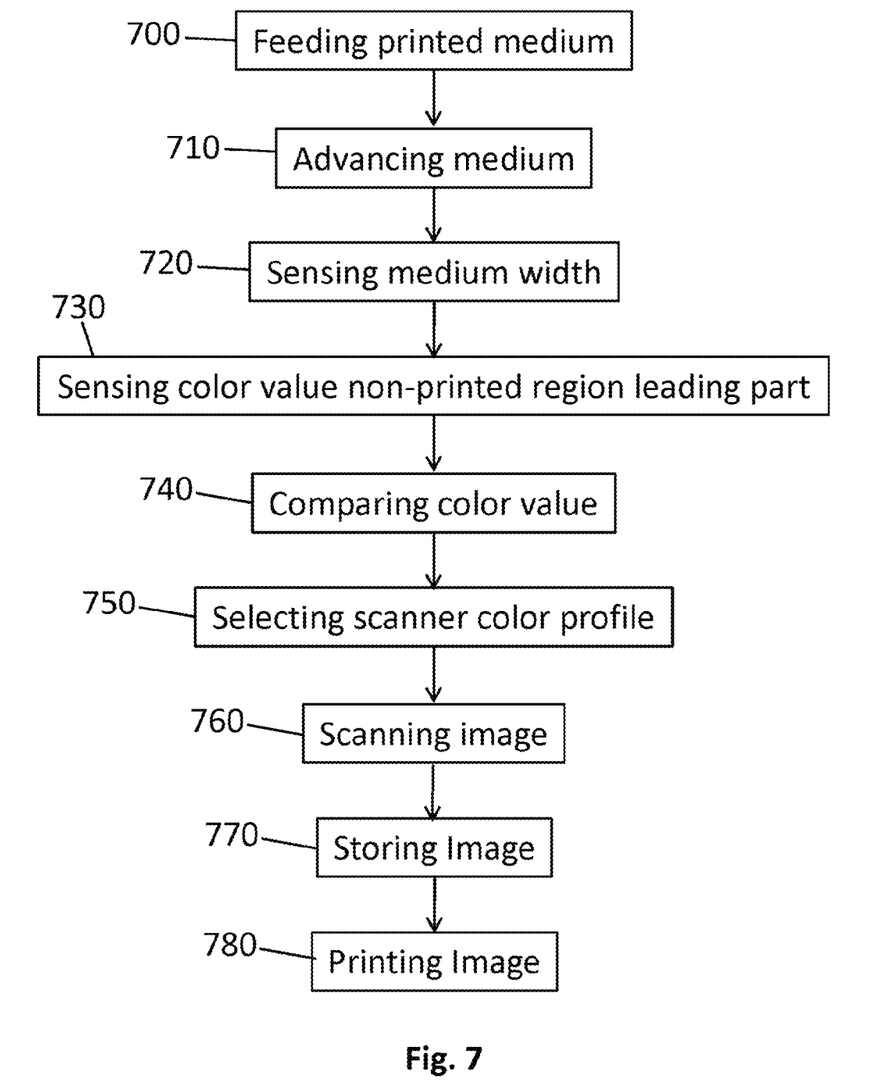
FIG. 7 shows a further embodiment of a method of selecting a color profile for a specific medium.

In FIG. 7, a further embodiment of a method of automatically selecting a scanner color profile is illustrated. A medium 3 containing an original image 9 may be fed to the scanner 1 and/or printer 100 (step 700). A media advance drive may advance the medium 3 along the scanner 1 (step 710). The scanner 1 may detect a media width of the medium 3, in a pre-scan process, before continuing with the original scan (step 720), as is done in particular prior art scanners. For example, during the pre-scan a first advance of approximately 25 centimeters, or less or of approximately 10 centimeters or less may be executed, to detect the width of the medium 3. During this pre-scan process the leading part 3A of the medium 3 may be scanned for the media width. At the same time, according to an embodiment of this invention the color value of the non-printed region 8 may be sensed (step 730). Consequently the sensed color value of the non-printed region 8 may be compared to the predetermined color values (step 740), examples of which are indicated in FIG. 5, and consequently a scanner color profile may be selected (step 750), for example as explained with reference to FIG. 4.

In an embodiment, the medium 3 is moved backwards into a scan position after the pre-scan. The original image 9 on the medium 3 may then be fully scanned (step 760). The selected scanner color profile may be used to map the scanned image to a device independent image. The device independent image may be stored (step 770). The stored image may be used for printing. A second medium, different from the medium 3 containing the original image 9 may be placed in the printer 100 for printing (780). A printer color profile may be applied to map the device independent image to a printer dependent image, and the image may be halftoned. The halftoned image is used for printing.

An automatic color profile selection may also be applied by scanning the second medium and determining the closest available printer color profile, before the second medium. Therefore, in certain embodiments, the color profile that is selected may comprise a printer color profile. Suitable printer color profiles may be predetermined and stored in the storage device 5, and used for printing, in addition to or instead of the scanner color profiles. A closest available printer color profile may be selected based on a scanned non-printed region of the second medium.

Figure 8:
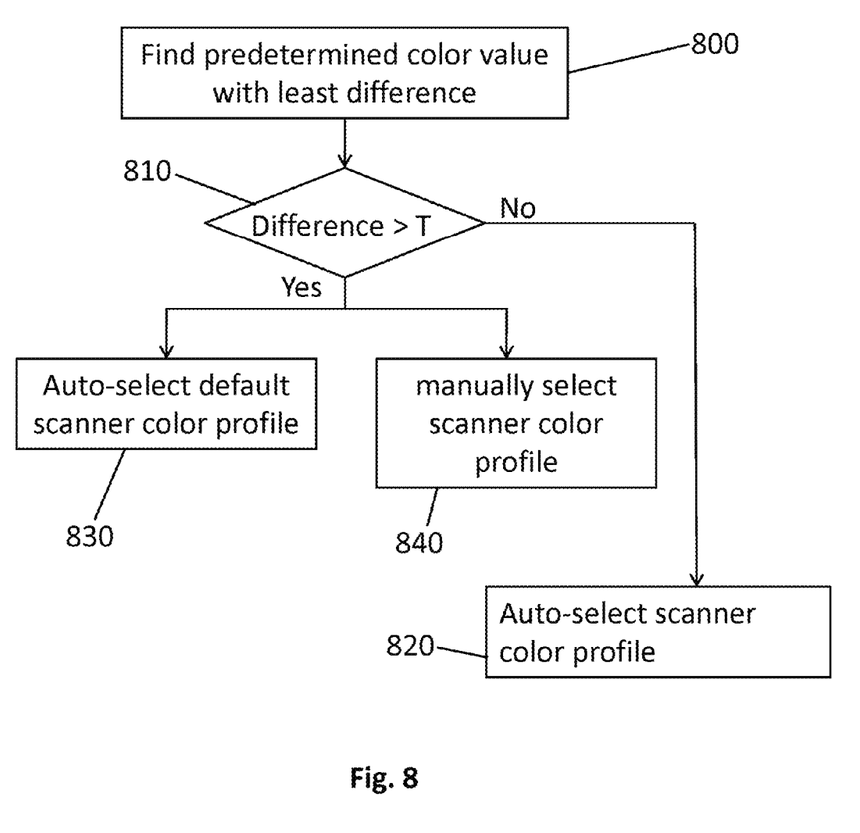
FIG. 8 shows an embodiment of a method of automatically selecting a default color profile or manually selecting a color profile.

FIG. 8 illustrates a flow chart of an embodiment wherein a scanner color profile is selected automatically or manually. At step 800, a predetermined color value having the least difference with the sensed color value needs to be found. However, in some instances the closest predetermined color value may show a large distance with respect to the sensed color value. For example, the medium 3 may be fully covered with the original image, or the medium 3 is very different from the preselected media samples.

Therefore, the sensed color value may be compared with the predetermined color values. It may be checked if the difference between the sensed color value and the closest predetermined color value is below a threshold T (step 810). For example, when the difference between a sensed color value and a corresponding predetermined color value is below the threshold T, the corresponding scanner color profile may be automatically selected (step 820), as discussed above.

However, the difference between a sensed color values and a closest predetermined color value may be larger than a predetermined threshold T (step 810). Then, selecting a closest scanner color profile may not provide for a desired accuracy.

Therefore, when the difference between the sensed color value and a closest predetermined color value is larger than the predetermined threshold T, the scanner may opt for selecting a default scanner color profile (step 830), or an operator may manually indicate a scanner color profile (step 840). An operator interface of the scanner 1 and/or printer 100 may indicate the option of the default scanner color profile, or the default scanner color profile may be automatically selected. The operator interface may be configured to automatically select a default scanner color profile, while having an overruling function so that an operator may overrule the default choice so as to indicate a different predetermined scanner color profile or change the process in another way. For example, the default scanner color profile may be automatically applied by the scanner 1 after a predetermined time interval.

In an embodiment, the threshold T may be approximately equal to, or larger than, the largest difference between two predetermined color values. For example, in FIG. 3 the threshold T may be set at approximately 18.4 dE76 units.

Figure 9:
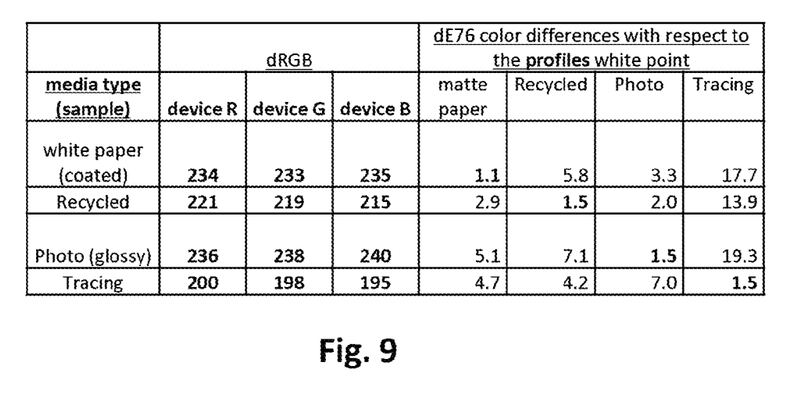
FIG. 9 shows a table plotting the sensed device dependent color values of different media, on the left, and on the right, the difference between the corresponding device independent color values, and the respective color profiles' predetermined white points as plotted in FIG. 5, the differences expressed according to the dE76 standard.

In FIG. 9, in the left part of the table, sensed RGB values of different tested non-printed media samples are plotted. The names of the selected media samples are indicated in rows. Predetermined media types are indicated in the right four columns. The predetermined media types correspond to the predetermined media of FIG. 5. The indicated RGB values were mapped to device independent values, according to each of the four predetermined scanner color profiles. The mapped values were compared with the predetermined white point color values of each of the predetermined profiles, as given in FIG. 5. In the right four columns the difference between the mapped color value and the predetermined white point color values are plotted. As can be seen, the least difference is shown for corresponding media types, so that in principle for each media type the closest available color profile can be automatically selected.

Figure 10:
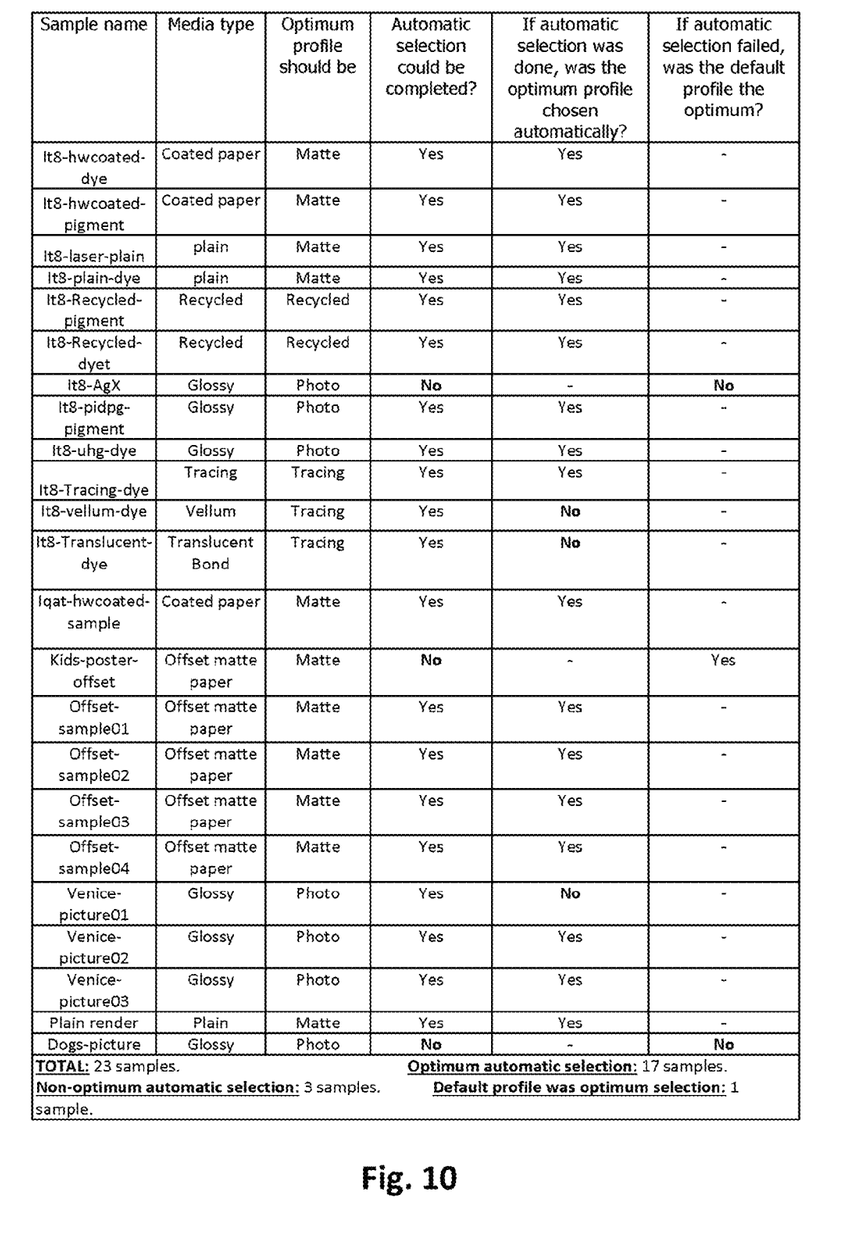
FIG. 10 shows the results of testing an automatic color profile selection method for various media types, according to an embodiment of this disclosure.

A test for an embodiment of an automatic scanner color profile selection method for various media types, different than the predetermined media types, is shown in the table of FIG. 10. The different tested samples are plotted in rows from top to bottom. From left to right, the first column shows the name of each sample. The second column shows the tested media type. The third column shows the media type as selected by the method of automatic scanner color profile selection. The fourth column shows if the automatic scanner color profile was selected ("yes"), and if not ("no"), a default profile was selected. The fifth column shows whether the optimum, or at least the closest available scanner color profile was automatically selected. The sixth column tells if, in case of the default scanner color profile selection, indeed the closest available scanner color profile was selected.

At the bottom of the table of FIG. 10, the results of a test are shown. A total of 23 media samples were tested. For 17 media samples, the correct scanner color profile was selected. For three media samples, the optimum automatic scanner color profile was not selected. For three media samples the default profile was selected, of which one was indeed the closest available profile. This shows that in 74% the optimum, or at least the closest available scanner color profile was selected, while for 13% of the tested media samples, a scanner color profile was selected that was not optimal, but it had a similar white point value as an optimal one (see FIG. 9). Hence, the automatic selection, although not optimal, was still relatively advantageous. For 4% the default profile was also the closest available scanner color profile, while in 9% of the failed cases, the default profile was not the optimum profile. Although in the latter 9% the corresponding print outs of the scanned media, as printed by the printer 100, still showed acceptable color accuracy, or at least a color accuracy that is comparable to printing with a printer that does not select a scanner color profile.

In an aspect of this disclosure, a scanner 1 may be provided. The scanner 1 may comprise an optical sensor 4 for sensing media color information. A storage device 5 may be provided, storing predetermined color values of preselected non-printed media and storing corresponding color profiles adapted for said respective preselected media. A processor 6 may be provided, configured to (i) process color values sensed by the optical sensor 4, (ii) compare a sensed color value with the predetermined color values, and (iii) select one of said color profiles based on the comparison. In an embodiment, the color profile is the scanner color profile. In an embodiment, the processor 6 is configured to (i) calculate the predetermined color value that is closest to a sensed color value, and (ii) select the color profile corresponding to the calculated closest predetermined color value. In a further embodiment, the processor 6 is configured to (i) select a default color profile, or (ii) apply a color profile as indicated by an operator, when a difference between the sensed color value and the closest predetermined color value is larger than a predetermined threshold T. In an embodiment, the threshold T approximately equals the largest difference between two of said predetermined color values.

In an embodiment, the optical sensor 4 comprises a photodiode sensor. In a further embodiment, the processor 6 is configured to detect sensed color values of a non-printed leading part 3A, 8 of a medium 3 that moves with respect to the optical sensor 4. In again a further embodiment, the processor 6 is configured to process the sensed color values of a non-printed leading part 3A, 8 of a medium that moves with respect to the optical sensor 4, while the scanner carries out a media width detection step.

As discussed in this disclosure, the predetermined color values may comprise white points of the respective color profiles. The sensed color values may comprise device dependent color values and mapped device independent color values. In an embodiment, (i) the sensed color values comprise device dependent color values, and (ii) the selected color profile is adapted to enable mapping of the device dependent color values to corresponding device independent color values. The color profile may comprise an ICC color profile.

In a further aspect a printer 100 is provided, connected to said scanner 1, or wherein said scanner 1 is embedded. The processor 6 may be configured to input the device independent color values into a print pipeline for conversion into a halftone image for subsequent printing by the printer 100.

In a further aspect, a method of automatically selecting a color profile for a specific medium 3 is provided. The method may comprise (i) optically scanning a non-printed region 8 of a medium 3, (ii) sensing a color value of the non-printed region 8, (iii) comparing the sensed color value with a number of predetermined color values corresponding to pre-selected non-printed media, and (iv) selecting a color profile based on the comparison. In an embodiment, the color profile comprises a scanner color profile. In an embodiment, the method may further comprise (i) determining the predetermined color value that is closest to the sensed color value, and (ii) selecting a color profile that corresponds to the closest predetermined color value. The sensed color value may for example comprise a device dependent color value or a device independent color value mapped from a device dependent color value.

In a further embodiment, the method comprises applying a default color profile when the difference between the sensed color value and the closest predetermined color value is larger than a predetermined threshold T. In again a further embodiment, comparing the sensed color value with a number of predetermined color values comprises (i) mapping the sensed color value through the predetermined color profiles, (ii) comparing each mapped sensed color value with a respective predetermined color value of a corresponding color profile, and (iii) determine which predetermined color value is closest to the mapped sensed color value and select its corresponding color profile.

The method may further comprise (i) moving a medium 3 containing an image 9 with respect to an optical sensor 4, (ii) scanning a leading part 8 of the medium 3, (iii) sensing the color value of the non-printed region 8 and selecting the color profile, (iv) scanning the image 9, and mapping color values of the image 9 according to the selected color profile, and storing the resulting image file 9. The stored image may be printed on a second medium.

In again a further aspect of the disclosure, a computer program product 7 may be provided, comprising (i) a list of color profiles corresponding to pre-selected print media, the list comprising white point values, and (ii) an algorithm, configured to (a) compare an input color value to the pre-calculated white point values, (b) determine a pre-calculated white point value that has the least difference with the input color value, and (c) selecting the color profile corresponding to the pre-calculated white point value.

Multiple predetermined color profiles, for example, two, three, four (FIG. 5), five, eight, ten or more may be stored in the storage medium 5.

In an embodiment (not shown), the predetermined color values pertaining to different predetermined media types may be indicated in device dependent color values (e.g. RGB), or in device independent color values (as described in this disclosure).

In certain embodiments, the optical sensor 4 may comprise a transistor type sensor such as a CMOS (Complementary Metal-Oxide Semiconductor) or and/or CCD (Charge Couple Device) arrangement.

The printer 100 may comprise a large and/or small format printer, an inkjet and/or a wet or dry toner laser printer. The printer 100 may comprise a copy machine. As will be clear from this description, different printer embodiments are suitable within the scope of this disclosure.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. The indefinite article "a" or "an" does not exclude a plurality, while a reference to a certain number of elements does not exclude the possibility of having more elements. A single unit may fulfil the functions of several items recited in the disclosure, and vice versa several items may fulfil the function of one unit.

In the following claims, the mere fact that certain measures are recited in mutually different dependent claims does not indicate that a combination of these measures cannot be used to advantage. Multiple alternatives, equivalents, variations and combinations may be made without departing from the scope of the invention.

The invention claimed is:

1. Scanner, comprising:
   an optical sensor for recording a device dependent image and for sensing device dependent print media color information;
   a storage device storing predetermined device independent color values of respective non-printed regions of preselected print media and storing corresponding scanner color profiles adapted for the respective preselected print media; and
   a processor, configured to:
      process device dependent color values of a non-printed region of a print medium sensed by the optical sensor;
      map a sensed device dependent color value of the non-printed region of the print medium through each of the scanner color profiles respectively corresponding to each of the preselected print media to generate a mapped, sensed device independent color value for each of the scanner color profiles used;
      compare each mapped, sensed device independent color value with the predetermined device independent color values;
      determine which predetermined device independent color value is closest to one of the mapped, sensed device independent color values by calculating a difference between each of the predetermined device independent color values of the non-printed regions of the preselected print media and each of the mapped, sensed device independent color values;
      automatically select one of the scanner color profiles based on the comparison and the determination by:
         selecting the scanner color profile corresponding to the predetermined device independent color value associated with a smallest difference; or
         selecting a default color profile when the differences are larger than a predetermined threshold; and
      automatically apply the selected one of the scanner color profiles to convert the device dependent image to a device independent image;
      wherein the non-printed regions do not have ink, toner, or another colored substance applied thereon.

2. Scanner according to claim 1, wherein the predetermined threshold approximately equals the largest difference between two of the predetermined device independent color values.

3. Scanner according to claim 1, wherein the optical sensor comprises a photodiode sensor.

4. Scanner according to claim 1, wherein the non-printed region of the print medium is a non-printed leading part of the print medium that does not have ink, toner, or another colored substance applied thereon, and wherein the processor is configured to detect the sensed device dependent color value of the non-printed leading part of the print medium that moves with respect to the optical sensor.

5. Scanner according to claim 4, wherein the processor is configured to process the sensed device dependent color value of the non-printed leading part of the print medium that moves with respect to the optical sensor, while the scanner carries out a media width detection step.

6. Scanner according to claim 1, wherein the processor is configured to:
   estimate a type of the print medium based upon the comparison and the determination; and
   select the one of said scanner color profiles that matches the scanner color profile of the estimated type of the print medium.

7. Printer, comprising the scanner according to claim 1, wherein the processor is configured to input the device independent color value into the print pipeline for conversion into a halftone image.

8. Method of automatically selecting a color profile for a specific medium, comprising:
   optically scanning a non-printed region of a print medium, the non-printed region not having ink, toner or another colored substance applied thereon;
   sensing a device dependent color value of the non-printed region;
   mapping the sensed device dependent color value through a predetermined color profile respectively corresponding to respective non-printed regions of preselected print media to generate a mapped, sensed device independent color value for each of the predetermined color profiles used, the respective non-printed regions not having ink, toner, or another colored substance applied thereon;
   comparing each mapped, sensed device independent color value with a respective predetermined device independent color value of a corresponding one of the predetermined scanner color profiles;
   determining which predetermined device independent color value is closest to the mapped, sensed device independent color value by calculating a difference between each of the predetermined device independent color values and each of the mapped, sensed device independent color values;
   estimating a type of the print medium based on the comparison and the determination;
   selecting a scanner color profile by:
      selecting the scanner color profile corresponding to the predetermined device independent color value associated with the smallest difference; or
      selecting a default color profile when the difference are larger than a predetermined threshold, the scanner color profile to convert a subsequently scanned device dependent image to a device independent image; and
   automatically applying the scanner color profile to convert a subsequently scanned device dependent image to a device independent image.

9. Method according to claim 8, wherein:
   prior to optically scanning, the method includes moving the print medium containing an image with respect to an optical sensor;
   optically scanning includes scanning a leading part of the print medium which includes the non-printed region; and after the sensing, mapping, comparing, determining, estimating, and selecting, the method further includes:
- scanning the image to obtain the device dependent image;
- applying the selected scanner color profile, thereby mapping color values of the device dependent image according to the selected scanner color profile to obtain the device independent image; and
- storing the device independent image.

10. Method according to claim 9, further comprising printing the image on a second medium.

11. Method according to claim 8 wherein the selected color profile is an ICC color profile.

12. Method according to claim 8 wherein the device dependent color value is an RGB value and the device independent color value and the mapped sensed device independent color value is a CIELab value or CIEXYZ value.

13. A computer program product stored on a non-transitory storage device, comprising:
- a list of color profiles corresponding to respective non-printed regions of pre-selected print media, the list comprising white point values, and the non-printed regions having no ink, toner, or other colored substance applied thereon; and
- an algorithm, configured to:
  - map an input device dependent color value of a non-printed region of a print medium through the color profiles to generate different mapped device independent color values for the input device dependent color value, the non-printed region having no ink, toner, or other colored substance applied thereon;
  - compare the mapped device independent color values with the white point values;
  - calculate a difference between each of the white point values and each of the mapped device independent color values;
  - determine, based on the calculation, a white point value that has the smallest difference with one of the mapped device independent color values;
  - estimate a type of the medium based upon the white point value that has the smallest difference with the one of the mapped device independent color values and thus the input device dependent color value;
  - automatically select i) the color profile that corresponds to the white point value that has the smallest difference with the one of the mapped device independent color values and thus the input device dependent color value or ii) a default color profile when the differences are larger than a predetermined threshold; and
  - automatically apply the selected color profile to convert a device dependent image to a device independent image.

* * * * *